(12) United States Patent
Ota

(10) Patent No.: US 10,024,259 B2
(45) Date of Patent: Jul. 17, 2018

(54) EXHAUST GAS CONTROL APPARATUS AND EXHAUST GAS CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Hirohiko Ota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 15/226,440

(22) Filed: Aug. 2, 2016

(65) Prior Publication Data

US 2017/0037801 A1 Feb. 9, 2017

(30) Foreign Application Priority Data

Aug. 6, 2015 (JP) .................................. 2015-156268

(51) Int. Cl.

| F01N 3/00 | (2006.01) |
|---|---|
| F02D 41/02 | (2006.01) |
| F01N 3/20 | (2006.01) |
| F01N 11/00 | (2006.01) |
| F01N 3/08 | (2006.01) |

(52) U.S. Cl.
CPC ....... *F02D 41/0275* (2013.01); *F01N 3/0814* (2013.01); *F01N 3/0842* (2013.01); *F01N 3/0885* (2013.01); *F01N 3/208* (2013.01); *F01N 3/2066* (2013.01); *F01N 11/002* (2013.01); *F01N 2610/02* (2013.01); *F01N 2610/1453* (2013.01); *F01N 2900/1411* (2013.01); *F01N 2900/1602* (2013.01); *F01N 2900/1622* (2013.01); *Y02T 10/24* (2013.01); *Y02T 10/47* (2013.01)

(58) Field of Classification Search
USPC ........................... 60/274, 286, 295, 301, 303
See application file for complete search history.

(56) References Cited

U.S. PATENT DOCUMENTS 6,119,448 A * 9/2000 Emmerling ............ B01D 53/90
60/274
8,281,572 B2 * 10/2012 Chi .......................... F01N 3/106
60/274

(Continued)

FOREIGN PATENT DOCUMENTS

JP 2014-088800 A 5/2014

*Primary Examiner* — Binh Q Tran
(74) *Attorney, Agent, or Firm* — Oliff PLC

(57) ABSTRACT

An exhaust gas control apparatus and method for an engine includes a urea water supply mechanism that adds urea water to exhaust gas, a SCR catalyst that adsorbs ammonia and removes NOx in the exhaust gas by using the adsorbed ammonia, and a control device that controls a urea water addition amount based on a target adsorption amount for the ammonia adsorbed onto the SCR catalyst. The control device executes an integration processing that acquires a temperature of the SCR catalyst at a predetermined cycle and integrates the acquired temperature of the SCR catalyst when equal to or higher than a threshold, and an initialization processing that decreases the amount of the ammonia adsorbed on the SCR catalyst on a condition that an integrated value of the temperature of the SCR catalyst calculated in the integration processing has become equal to or higher than a predetermined value.

10 Claims, 6 Drawing Sheets

(56) References Cited

U.S. PATENT DOCUMENTS

| | | | | |
|---|---|---|---|---|
| 8,863,503 B2 * | 10/2014 | Yasui | ............... | F01N 3/10 |
| | | | | 60/274 |
| 8,899,024 B2 * | 12/2014 | Masaki | ............ | F01N 3/208 |
| | | | | 60/286 |
| 9,297,287 B2 * | 3/2016 | Hirota | ............ | F01N 3/208 |
| 9,567,890 B2 * | 2/2017 | Schmitt | ........... | F01N 11/005 |
| 2015/0231569 A1 | 8/2015 | Takayanagi | | |

\* cited by examiner

EXHAUST GAS CONTROL APPARATUS AND EXHAUST GAS CONTROL METHOD FOR INTERNAL COMBUSTION ENGINE

INCORPORATION BY REFERENCE

The disclosure of Japanese Patent Application No. 2015-156268 filed on Aug. 6, 2015 including the specification, drawings and abstract is incorporated herein by reference in its entirety.

BACKGROUND

1. Technical Field

The disclosure relates to an exhaust gas control system and an exhaust gas control apparatus for an internal combustion engine.

2. Description of Related Art

Japanese Patent Application Publication No. 2014-88800 (JP 2014-88800 A) discloses an internal combustion engine that is provided with a catalyst which removes nitrogen oxide (NOx) in exhaust gas. An adding mechanism that adds urea water to the exhaust gas is disposed in an exhaust passage of the internal combustion engine, and ammonia resulting from the urea water is adsorbed onto the catalyst for the NOx removal. The NOx is reduced and removed by the use of the ammonia that is adsorbed on the catalyst.

When the amount of the ammonia adsorbed on the catalyst is insufficient, an appropriate NOx removal cannot be performed. When the ammonia adsorption amount is excessive, an ammonia slip is likely to occur. Accordingly, it is desirable to execute an ammonia adsorption amount control, which sets a target adsorption amount for the ammonia adsorbed onto the catalyst and controls a urea water addition amount based on the target adsorption amount.

Inhibiting an error between the target adsorption amount and the actual ammonia adsorption amount is important in executing the ammonia adsorption amount control. When a high-temperature state of the catalyst continues for a long period of time, however, the amount of the ammonia that is desorbed from the catalyst increases, and thus the actual ammonia adsorption amount deviates from the target adsorption amount, which causes error to be accumulated.

In the apparatus that is disclosed in JP 2014-88800 A, for example, the temperature of the catalyst is raised by a processing for raising the temperature of the exhaust gas being executed when a deviation between an estimated value of the ammonia adsorption amount and the actual ammonia adsorption amount becomes equal to or greater than a predetermined value. This allows an initialization processing, by which the ammonia is entirely desorbed from the catalyst, to be performed. When the initialization processing is performed, the accumulated error is eliminated, and thus the deviation of the actual ammonia adsorption amount with respect to the target adsorption amount can be inhibited during the subsequent ammonia adsorption amount control.

SUMMARY

In the apparatus that is disclosed in JP 2014-88800 A, an error of the estimated value of the ammonia adsorption amount itself might result in an inaccurate calculation of the deviation described above. In this case, an incorrect deviation is calculated. Once a state where the deviation falls short of the predetermined value continues as a result of the inaccurately calculated deviation, a state where the initialization processing is not executed continues, and then the error might increase.

The embodiments provide an exhaust gas control system and an exhaust gas control method for an internal combustion engine that suppresses an increase in an error of an actual ammonia adsorption amount with respect to a target adsorption amount that is attributable to the continuation of a state where an initialization processing is not executed.

One example aspect provides an exhaust gas control system for an internal combustion engine. The internal combustion engine includes an exhaust gas control apparatus. The exhaust gas control apparatus includes an adding mechanism such as an injector/valve and a catalyst. The adding mechanism is configured to add urea water to exhaust gas. The catalyst is configured to adsorb ammonia resulting from the urea water and remove NOx by using the adsorbed ammonia. The exhaust gas control system includes an electronic control unit configured to: set a target adsorption amount for the ammonia adsorbed onto the catalyst; control a urea water addition amount based on the target adsorption amount; acquire a temperature of the catalyst; execute an integration processing that acquires the temperature of the catalyst at a predetermined cycle and integrates the temperature of the catalyst equal to or higher than a threshold determined in advance; and execute an initialization processing that decreases the amount of the ammonia adsorbed on the catalyst on a condition that an integrated value of the temperature of the catalyst calculated in the integration processing has become equal to or higher than a predetermined value.

As described above, when a high-temperature state of the catalyst continues for a long period of time, an error between the target adsorption amount and the actual ammonia adsorption amount is accumulated and increased. In this regard, according to the configuration described above, the temperature of the catalyst equal to or higher than the threshold determined in advance is integrated as a parameter for determining whether or not the high-temperature state of the catalyst has continued for a long period of time. Then, the initialization processing is executed in a case where it can be determined that the cumulative error between the target adsorption amount and the actual ammonia adsorption amount has been increased by the integrated value of the temperature of the catalyst being equal to or higher than the predetermined value, and thus the initialization processing is reliably executed based on the integrated value of the temperature of the catalyst. Accordingly, an increase in the error of the actual ammonia adsorption amount with respect to the target adsorption amount that is attributable to the continuation of a state where the initialization processing is not executed can be suppressed.

In the exhaust gas control system, the electronic control unit may be configured to (1) acquire a temperature of the exhaust gas flowing into the catalyst, (2) acquire a flow rate of the exhaust gas flowing into the catalyst, and (3) correct the acquired exhaust gas temperature to decrease as the acquired exhaust gas flow rate decreases and use the corrected temperature as the temperature of the catalyst.

The temperature of the catalyst is raised by heat transfer from the exhaust gas. The amount of the heat that is transferred from the exhaust gas to the catalyst decreases as the flow rate of the exhaust gas flowing into the catalyst decreases. Accordingly, when the temperature of the catalyst is calculated with the effect of the exhaust gas flow rate taken into account, the temperature of the catalyst can be more accurately calculated. As a result, the integrated value of the temperature of the catalyst can also be more accurately calculated.

According to the configuration described above, the temperature of the exhaust gas flowing into the catalyst and the flow rate of the exhaust gas flowing into the catalyst are acquired. Then, the acquired exhaust gas temperature is corrected to decrease as the acquired exhaust gas flow rate decreases and the corrected temperature is used as the temperature of the catalyst. Accordingly, the temperature of the catalyst that is acquired by the electronic control unit decreases as the flow rate of the exhaust gas decreases. As a result, the integrated value of the catalyst temperature calculated in the initialization processing decreases as the exhaust gas flow rate decreases. During the calculation of the integrated value of the temperature of the catalyst as described above, the effect of the exhaust gas flow rate regarding the amount of the heat transferred from the exhaust gas to the catalyst is taken into account, and thus the integrated value of the temperature of the catalyst can be accurately calculated.

In the exhaust gas control system, the electronic control unit may be configured to execute, as the initialization processing, a temperature-raising processing for raising the temperature of the exhaust gas flowing into the catalyst to a temperature at which the ammonia is desorbed from the catalyst.

According to the configuration described above, the ammonia desorption from the catalyst is prompted since the catalyst temperature is raised by the temperature-raising processing. Accordingly, the amount of the ammonia adsorbed on the catalyst can be decreased (for example, to zero).

In the exhaust gas control system, the electronic control unit may be configured to execute, as the initialization processing, a processing for stopping the urea water addition from the adding mechanism. According to the configuration described above, the urea water addition is stopped, and thus a reduction treatment of the NOx flowing into the catalyst is performed by the ammonia adsorbed on the catalyst before the urea water addition is stopped. Accordingly, the ammonia adsorbed on the catalyst is consumed by a NOx reduction reaction with the NOx, and the ammonia adsorption amount of the catalyst gradually decreases (for example, to zero). Accordingly, the amount of the ammonia adsorbed on the catalyst can be decreased in the end.

In the exhaust gas control system, the electronic control unit may be configured to measure an execution time of the initialization processing and execute the initialization processing until the measured execution time reaches a threshold determined in advance.

According to the configuration described above, the initialization processing can be terminated in a stage in which the amount of the ammonia adsorbed on the catalyst becomes zero ("0") by the execution time threshold being appropriately set.

Another example aspect provides an exhaust gas control method for an internal combustion engine. The internal combustion engine includes an exhaust gas control apparatus. The exhaust gas control apparatus includes an adding mechanism such as an injector/valve and a catalyst. The adding mechanism is configured to add urea water to exhaust gas, and the catalyst is configured to adsorb ammonia resulting from the urea water and remove NOx by using the adsorbed ammonia. The exhaust gas control method includes: setting a target adsorption amount for the ammonia adsorbed onto the catalyst and controlling a urea water addition amount based on the target adsorption amount; acquiring a temperature of the catalyst; executing an integration processing that acquires the temperature of the catalyst at a predetermined cycle and integrates the temperature of the catalyst equal to or higher than a threshold determined in advance; and executing an initialization processing that decreases the amount of the ammonia adsorbed on the catalyst on a condition that an integrated value of the temperature of the catalyst calculated in the integration processing has become equal to or higher than a predetermined value.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
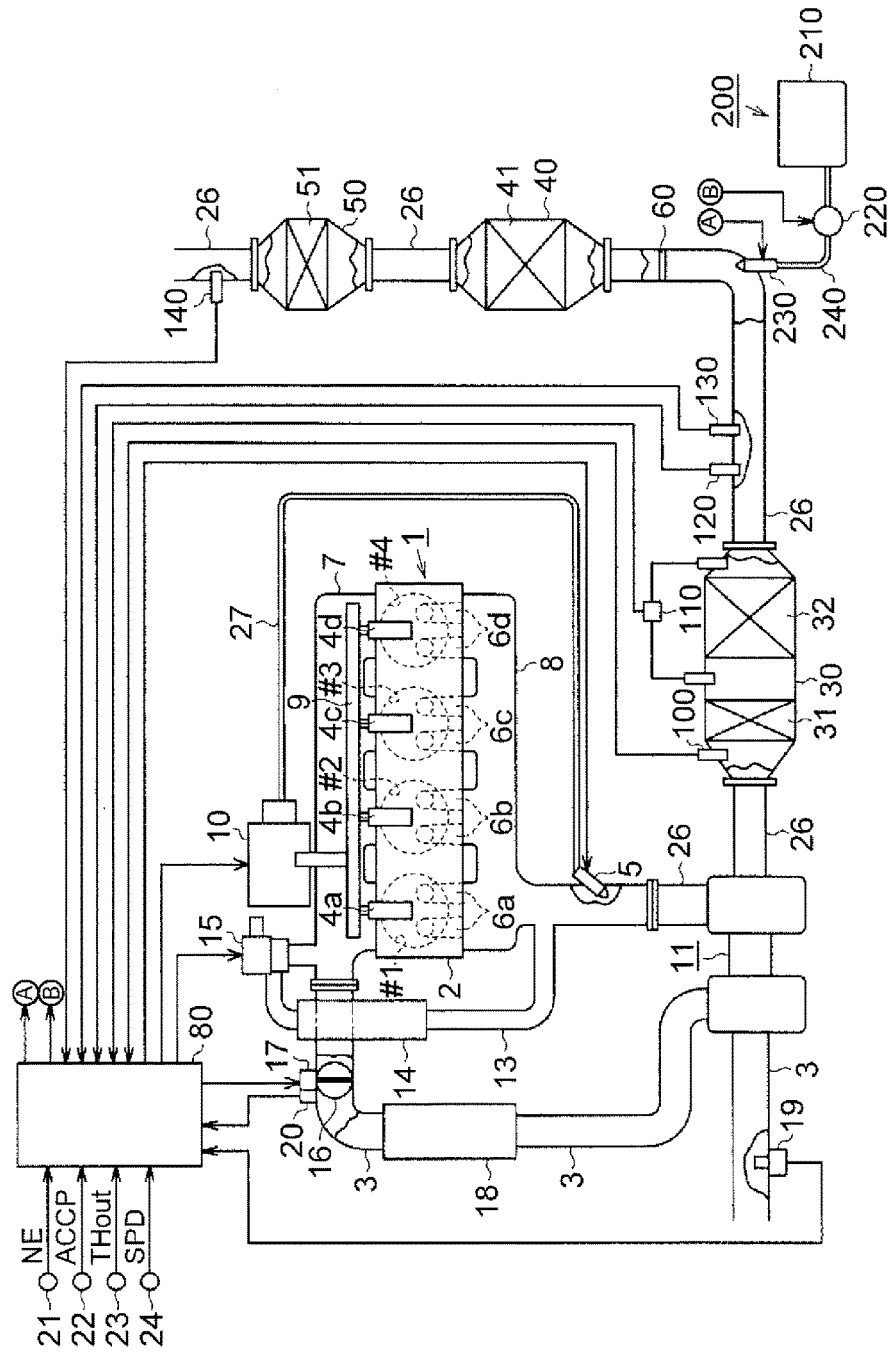
FIG. 1 is a schematic diagram illustrating an internal combustion engine to which an embodiment of an exhaust gas control apparatus for an internal combustion engine is applied and a peripheral configuration thereof.

Hereinafter, a specific embodiment of an exhaust gas control apparatus for an internal combustion engine will be described with reference to FIGS. 1 to 6. FIG. 1 shows a diesel engine (hereinafter, simply referred to as an "engine") to which the exhaust gas control apparatus according to this embodiment is applied and a peripheral configuration thereof.

A plurality of cylinders #1 to #4 are disposed in an engine 1. A plurality of fuel injection valves 4a to 4d are disposed in a cylinder head 2 to correspond to the respective cylinders #1 to #4. These fuel injection valves 4a to 4d inject a fuel into combustion chambers of the respective cylinders #1 to #4. An intake port for introducing fresh air into the cylinders and exhaust ports 6a to 6d for discharging combustion gas (exhaust gas) out of the cylinders are disposed in the cylinder head 2 to correspond to the respective cylinders #1 to #4.

The fuel injection valves 4a to 4d are connected to a common rail 9 that accumulates a high-pressure fuel. The common rail 9 is connected to a supply pump 10. The supply pump 10 suctions the fuel in a fuel tank and supplies the high-pressure fuel to the common rail 9. When the fuel injection valves 4a to 4d are open, the high-pressure fuel supplied to the common rail 9 is injected into the cylinders from the respective fuel injection valves 4a to 4d.

An intake manifold 7 is connected to the intake port. The intake manifold 7 is connected to an intake passage 3. An intake throttle valve 16 for suctioned air amount adjustment is disposed in the intake passage 3.

An exhaust manifold 8 is connected to the exhaust ports 6a to 6d. The exhaust manifold 8 is connected to an exhaust passage 26. A turbocharger 11, which supercharges suctioned air introduced into the cylinders by using an exhaust gas pressure, is disposed in the middle of the exhaust passage 26. On the intake passage 3, an intercooler 18 is disposed between an intake side compressor of the turbocharger 11 and the intake throttle valve 16. The intercooler 18 cools the suctioned air with a temperature raised by the supercharging by the turbocharger 11.

A first purification member 30 that purifies exhaust gas is disposed on the downstream side of an exhaust side turbine of the turbocharger 11 and in the middle of the exhaust passage 26. In the first purification member 30, an oxidation catalyst 31 and a filter 32 are arranged in series with respect to a direction in which the exhaust gas flows.

A catalyst that performs an oxidation treatment on HC in the exhaust gas is supported on the oxidation catalyst 31. The filter 32 is a member that collects particulate matter (PM) in the exhaust gas and is configured to use porous ceramic. A catalyst that promotes PM oxidation is supported on the filter 32. The PM in the exhaust gas is collected when the exhaust gas passes through a porous wall of the filter 32.

A fuel adding valve 5 for adding the fuel to the exhaust gas is disposed in the vicinity of a merging portion of the exhaust manifold 8. The fuel adding valve 5 is connected to the supply pump 10 via a fuel supply pipe 27. A position at which the fuel adding valve 5 is arranged can be appropriately changed insofar as the position is on the upstream side of the first purification member 30 in an exhaust system. The fuel may be added to the exhaust gas by a post injection being performed with a fuel injection timing adjusted.

When the amount of the PM collected by the filter 32 exceeds a predetermined value, a regeneration treatment for the filter 32 is initiated. During the regeneration treatment for the filter 32, the fuel is injected into the exhaust manifold 8 from the fuel adding valve 5. The fuel that is injected from the fuel adding valve 5 is oxidized upon reaching the oxidation catalyst 31. Then, the temperature of the exhaust gas rises. Then, the temperature of the filter 32 rises by the exhaust gas heated at the oxidation catalyst 31 flowing into the filter 32. In this manner, the filter 32 is regenerated by the PM deposited in the filter 32 being subjected to the oxidation treatment.

A second purification member 40 that purifies the exhaust gas is disposed on the downstream side of the first purification member 30 and in the middle of the exhaust passage 26. A selective reduction-type NOx catalyst (hereinafter, referred to as a SCR catalyst) 41 that reduces and removes the NOx in the exhaust gas by using ammonia is arranged in the second purification member 40.

A third purification member 50 that purifies the exhaust gas is disposed on the downstream side of the second purification member 40 and in the middle of the exhaust passage 26. An ammonia oxidation catalyst 51 that removes the ammonia in the exhaust gas is arranged in the third purification member 50.

A urea water supply mechanism 200 as an adding mechanism that adds urea water to the exhaust gas is provided for the engine 1. The urea water supply mechanism 200 is configured to be provided with a tank 210 that stores the urea water, a urea adding valve 230 that supplies the urea water into the exhaust passage 26 by injection, a supply passage 240 that connects the urea adding valve 230 and the tank 210 to each other, and a pump 220 that is disposed in the middle of the supply passage 240.

The urea adding valve 230 is disposed between the first purification member 30 and the second purification member 40 on the exhaust passage 26. When the urea adding valve 230 is open, the urea water is supplied by injection into the exhaust passage 26 via the supply passage 240.

The pump 220 is an electric pump. During a positive rotation of the pump 220, the urea water is fed from the tank 210 toward the urea adding valve 230. During a reverse rotation of the pump 220, the urea water is fed from the urea adding valve 230 to the tank 210. In other words, during the reverse rotation of the pump 220, the urea water is recovered from the urea adding valve 230 and the supply passage 240 and is returned to the tank 210.

A dispersion plate 60 is disposed between the urea adding valve 230 and the SCR catalyst 41 in the exhaust passage 26. The dispersion plate 60 promotes the atomization of the urea water by dispersing the urea water injected from the urea adding valve 230.

The urea water injected from the urea adding valve 230 becomes ammonia after being hydrolyzed by heat of the exhaust gas. This ammonia is adsorbed onto the SCR catalyst 41 upon reaching the SCR catalyst 41. Then, the NOx is reduced and removed by the use of the ammonia adsorbed on the SCR catalyst 41.

Figure 2:
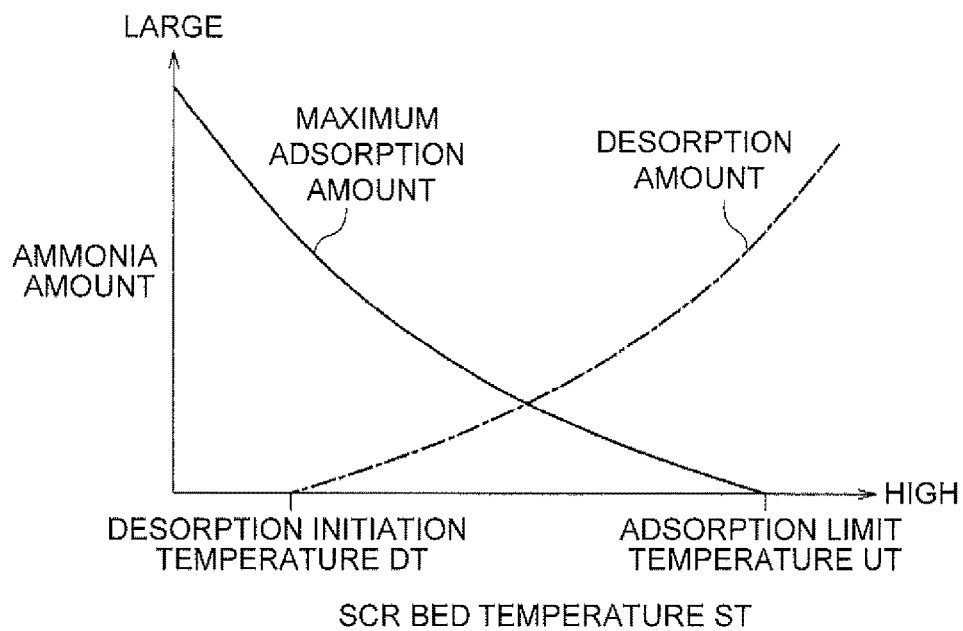
FIG. 2 is a graph illustrating a relationship of a maximum ammonia adsorption amount and an ammonia desorption amount to a catalyst temperature.

As illustrated in FIG. 2, a maximum ammonia adsorption amount of the SCR catalyst 41 decreases as a SCR bed temperature ST, which is the temperature of the SCR catalyst 41, increases and the SCR catalyst 41 becomes incapable of adsorbing the ammonia once the SCR bed temperature ST exceeds an adsorption limit temperature UT. Once the SCR bed temperature ST exceeds a desorption initiation temperature DT, the ammonia begins to be desorbed from the SCR catalyst 41. The desorption initiation temperature DT is a temperature that is lower than the adsorption limit temperature UT. The amount of the ammonia that is desorbed from the SCR catalyst 41 increases as the SCR bed temperature ST increases. Accordingly, as the SCR bed temperature ST increases with a rise in the exhaust gas temperature, the maximum ammonia adsorption amount decreases and the ammonia desorption amount increases.

The engine 1 is provided with an exhaust gas recirculation device (hereinafter, referred to as an EGR device), too. An EGR passage 13, an EGR valve 15, an EGR cooler 14, and the like constitute the EGR device. The EGR passage 13 allows the intake manifold 7 and the exhaust manifold 8 to communicate with each other. The EGR valve 15 is disposed on the EGR passage 13. The EGR cooler 14 is disposed in the middle of the EGR passage 13. An EGR amount, which is the amount of the exhaust gas that is returned to the intake passage from the exhaust passage 26, is adjusted by an opening degree of the EGR valve 15 being adjusted in accordance with engine operation states. The temperature of the exhaust gas that flows through the EGR passage 13 is lowered by the EGR cooler 14.

Various sensors for engine operation state detection are attached to the engine 1. For example, an air flow meter 19 detects a suctioned air amount GA. A throttle valve opening degree sensor 20 detects an opening degree of the intake throttle valve 16. A crank angle sensor 21 detects an engine rotation speed NE. An accelerator sensor 22 detects an accelerator pedal depression amount, that is, an accelerator operation amount ACCP. An outside air temperature sensor 23 detects an outside air temperature THout. A vehicle speed sensor 24 detects a vehicle speed SPD of a vehicle in which the engine 1 is mounted.

A first exhaust gas temperature sensor 100 that is disposed on the upstream side of the oxidation catalyst 31 detects a first exhaust gas temperature TH1, which is the temperature of the exhaust gas flowing into the oxidation catalyst 31. A differential pressure sensor 110 detects a pressure difference ΔP between the exhaust gas pressure on the upstream side of the filter 32 and the exhaust gas pressure on the downstream side of the filter 32.

On the exhaust passage 26, a second exhaust gas temperature sensor 120 and a first NOx sensor 130 are disposed on the upstream side of the urea adding valve 230 and between the first purification member 30 and the second purification member 40. The second exhaust gas temperature sensor 120 detects a second exhaust gas temperature TH2, which is the temperature of the exhaust gas flowing into the SCR catalyst 41. This second exhaust gas temperature TH2 is more suitable than the first exhaust gas temperature TH1 as a temperature correlated to the temperature of the SCR catalyst 41. The first NOx sensor 130 detects a first NOx concentration N1, which is a NOx concentration of the exhaust gas that has yet to flow into the SCR catalyst 41.

On the exhaust passage 26, a second NOx sensor 140 is disposed on the downstream side of the third purification member 50. The second NOx sensor 140 detects a second NOx concentration N2, which is the NOx concentration of the exhaust gas purified by the SCR catalyst 41.

Outputs from these various sensors and the like are input to a control device 80. This control device 80 is configured to have a microcomputer as a main component. The microcomputer is provided with a central processing unit (CPU), a read-only memory (ROM) in which various programs, maps, and the like are stored in advance, a random access memory (RAM) that temporarily stores a calculation result of the CPU and the like, a timer counter, an input interface, an output interface, and the like.

The control device 80 performs various types of controls for the engine 1 such as fuel injection quantity and timing controls for the fuel injection valves 4a to 4d and the fuel adding valve 5, a discharge pressure control for the supply pump 10, a driving amount control for an actuator 17 that opens and closes the intake throttle valve 16, and an opening degree control for the EGR valve 15.

Various exhaust gas purification controls such as the above-described regeneration treatment for the combustion of the PM collected by the filter 32 are performed by the control device 80, too. The control device 80 controls urea water addition by the urea adding valve 230 as an example of the exhaust gas purification control. During this addition control, a urea addition amount QE that is required for a reduction treatment of the NOx discharged from the engine 1 is calculated based on the engine operation state and the like. During an ignition control, the opening state of the urea adding valve 230 is controlled such that the urea water equivalent in amount to the calculated urea addition amount QE is injected from the urea adding valve 230. The control device 80 also executes an ammonia adsorption amount control, which is to control the ammonia adsorption amount of the SCR catalyst 41, as an example of this addition control.

Figure 3:
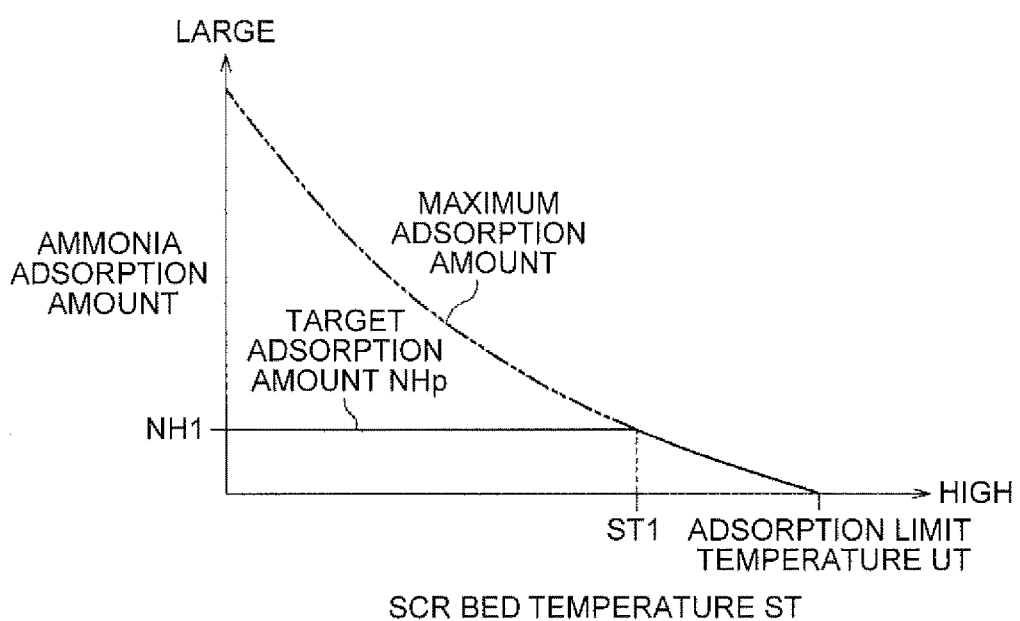
FIG. 3 is a graph illustrating a relationship between the catalyst temperature and a target adsorption amount.

As illustrated in FIG. 3, during the ammonia adsorption amount control, a target ammonia adsorption amount NHp that is required for the NOx reduction treatment to be performed in the SCR catalyst 41 is set. In this embodiment, a constant fixed value NH1 is set as the target adsorption amount NHp in a case where the SCR bed temperature ST is equal to or lower than a predetermined temperature ST1. In a region where the SCR bed temperature ST exceeds the temperature ST1, the target adsorption amount NHp is set to an amount that is smaller than the fixed value NH1. More specifically, the target adsorption amount NHp is variably set to decrease as the SCR bed temperature ST increases above ST1. Then, the ammonia adsorption amount is controlled, such that the actual ammonia adsorption amount of the SCR catalyst 41 (hereinafter, referred to as an actual adsorption amount) corresponds to the target adsorption amount NHp, by the urea addition amount QE being corrected based on the target adsorption amount NHp.

When a high-temperature state of the SCR catalyst 41 continues for a long period of time, the amount of the ammonia that is desorbed from the SCR catalyst 41 increases. Accordingly, an actual adsorption amount NHR deviates from the target adsorption amount NHp and an error of the actual adsorption amount NHR with respect to the target adsorption amount NHp is accumulated.

The control device 80 executes the following integration processing and initialization processing in order to suppress the increase in the error. The control device 80 first calculates a temperature integrated value HS as a parameter for determining whether or not the high-temperature state of the SCR catalyst 41 has continued for a long period of time. The temperature integrated value HS is an integrated value of the temperature of the SCR catalyst 41 at a time when the temperature of the SCR catalyst 41 is equal to or higher than a threshold determined in advance, more specifically, when the temperature of the SCR catalyst 41 is equal to or higher than the desorption initiation temperature DT at which the ammonia is desorbed from the SCR catalyst 41.

Figure 4:
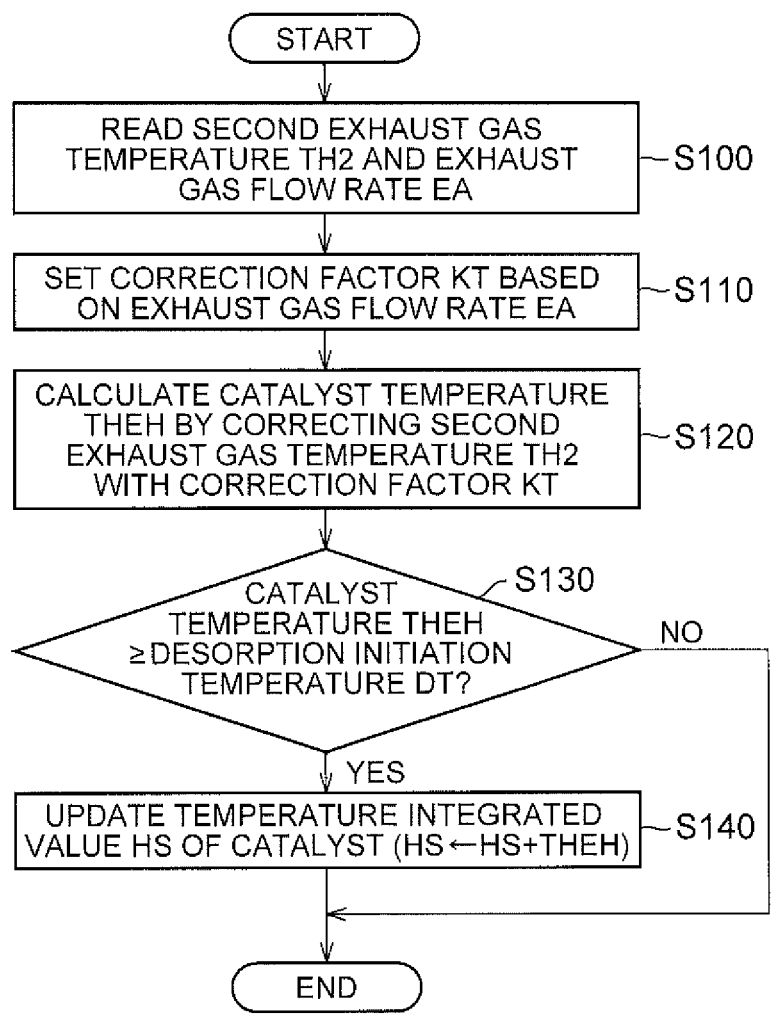
FIG. 4 is a flowchart illustrating a procedure of an integration processing according to the embodiment.

A processing procedure of the integration processing for the calculation of the temperature integrated value HS is illustrated in FIG. 4. This processing is repeatedly executed at a predetermined cycle. Once this processing is initiated, the control device 80 reads the second exhaust gas temperature TH2 that is a detected value of the temperature of the exhaust gas flowing into the SCR catalyst 41 and an exhaust gas flow rate EA that is the flow rate of the exhaust gas flowing into the SCR catalyst 41 (S100). The exhaust gas flow rate EA can be obtained from the suctioned air amount GA, an engine load, the engine rotation speed NE, or the like.

Then, the control device 80 sets a correction factor KT based on the exhaust gas flow rate EA (S110). This correction factor KT is a value for correcting the second exhaust gas temperature TH2, and has a variably set value that exceeds "0" and is equal to or less than "1" based on the exhaust gas flow rate EA. More specifically, the correction factor KT is set to decrease as the exhaust gas flow rate EA decreases.

Then, the control device 80 calculates a temperature corresponding to the SCR bed temperature ST (S120), that is, a catalyst temperature THEH which is the temperature of the SCR catalyst 41, by correcting the second exhaust gas temperature TH2 with the correction factor KT based on the following Equation (1).

$$\text{Catalyst temperature } THEH = \text{Second exhaust gas temperature } TH2 \times \text{Correction factor } KT \qquad (1)$$

As described above, the correction factor KT is a value that exceeds "0" and is equal to or less than "1" and is set to decrease as the exhaust gas flow rate EA decreases. Accordingly, in the processing of Step S120, the second exhaust gas temperature TH2 that is a value detected by the second exhaust gas temperature sensor 120 is corrected to decrease as the exhaust gas flow rate EA decreases, and the second exhaust gas temperature TH2 subsequent to that correction is set to the catalyst temperature THEH.

Then, the control device 80 determines whether or not the catalyst temperature THEH calculated in Step S120 is equal to or higher than the desorption initiation temperature DT described above (S130). When the catalyst temperature THEH falls short of the desorption initiation temperature DT (S130: NO), the control device 80 terminates this processing.

When the catalyst temperature THEH is equal to or higher than the desorption initiation temperature DT (S130: YES), the control device 80 terminates this processing after executing a processing for updating the temperature integrated value HS (S140). In Step S140, the temperature integrated value HS at a time of the current execution of this processing is calculated by the catalyst temperature THEH calculated in Step S120 being added to the temperature integrated value HS calculated at a time of the previous execution of this processing.

By this integration processing being repeatedly executed, the temperature integrated value HS increases by catalyst temperature THEH at every integration processing execution cycle in a case where the catalyst temperature THEH is equal to or higher than the desorption initiation temperature DT described above. The temperature integrated value HS is reset to "0" at a point in time when the initialization processing (described later) is terminated/completed and at a point in time when the regeneration treatment for the filter 32 is terminated/completed, and then the integration is initiated again.

The following effects are achieved by the integration processing illustrated in FIG. 4 being executed. The temperature of the SCR catalyst 41 is raised by heat transfer from the exhaust gas. The amount of the heat that is transferred from the exhaust gas to the SCR catalyst 41 decreases as the flow rate of the exhaust gas flowing into the SCR catalyst 41 decreases. Accordingly, when the temperature of the SCR catalyst 41 is calculated with the effect of the exhaust gas flow rate taken into account, the temperature of the SCR catalyst 41 can be accurately calculated. As a result, the temperature integrated value HS can be accurately calculated.

In the integration processing according to this embodiment described above, each of the processing of Step S100, Step S110, and Step S120 is executed. Then, the detected value of the temperature of the exhaust gas flowing into the SCR catalyst 41 is corrected to decrease as the flow rate of the exhaust gas flowing into the SCR catalyst 41 decreases, and the temperature resulting from this correction is used as the catalyst temperature THEH. In Step S140, the temperature integrated value HS is calculated by the integration of the catalyst temperature THEH. Accordingly, the catalyst temperature THEH decreases as the exhaust gas flow rate EA decreases. As a result, the temperature integrated value HS calculated in Step S140 decreases as the exhaust gas flow rate EA decreases. During the calculation of the temperature integrated value HS described above, the effect of the exhaust gas flow rate EA regarding the amount of the heat transferred from the exhaust gas to the SCR catalyst 41 is taken into account, and thus the temperature integrated value HS is accurately calculated.

On a condition that the temperature integrated value HS calculated as described above has become equal to or greater than a predetermined threshold HS1, the control device 80 executes the initialization processing for decreasing the amount of the ammonia adsorbed on the SCR catalyst 41 to "0".

Figure 5:
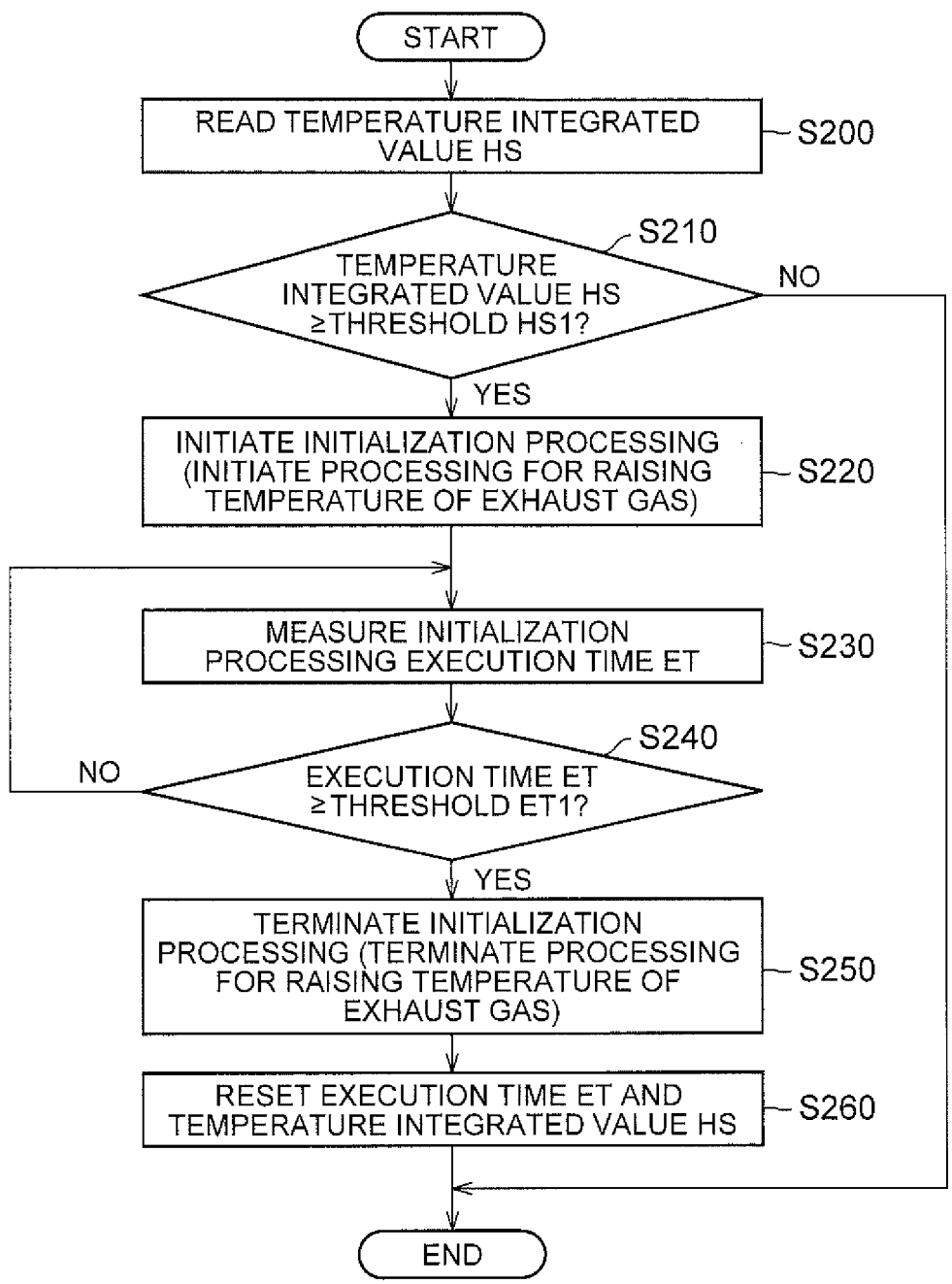
FIG. 5 is a flowchart illustrating a series of processing procedures at a time when an initialization processing according to the embodiment is executed.

FIG. 5 shows a series of processing procedures for the execution of the initialization processing. This processing is also repeatedly executed at a predetermined cycle. Once this processing is initiated, the control device 80 first reads the current temperature integrated value HS (S200). Then, the control device 80 determines whether or not the temperature integrated value HS is equal to or greater than the threshold HS1 (S210). When the high-temperature state of the SCR catalyst 41 continues for a long period of time, the temperature integrated value HS increases. Accordingly, it is conceivable that the amount of the ammonia desorbed from the SCR catalyst 41 is likely to increase and a cumulative value of the error of the actual adsorption amount NHR with respect to the target adsorption amount NHp increases as the temperature integrated value HS increases. In this regard, a value of the temperature integrated value HS that allows a determination that the cumulative value of the error of the actual adsorption amount NHR with respect to the target adsorption amount NHp has increased to an unallowable extent is set to the threshold HS1 in advance through experimentation or the like.

When the temperature integrated value HS falls short of the threshold HS1 (S210: NO), the cumulative value of the error of the actual adsorption amount NHR with respect to the target adsorption amount NHp is insignificant. Accordingly, the control device 80 terminates this processing.

When the temperature integrated value HS is equal to or greater than the threshold HS1 (S210: YES), the cumulative value of the error of the actual adsorption amount NHR with respect to the target adsorption amount NHp is high to an unallowable extent, and thus the control device 80 initiates the initialization processing (S220) for decreasing the amount of the ammonia adsorbed on the SCR catalyst 41 to "0".

In this embodiment, a temperature-raising processing for raising the temperature of the exhaust gas flowing into the SCR catalyst 41 is executed as this initialization processing. This temperature-raising processing can be appropriately executed. For example, the temperature of the exhaust gas can be raised by fuel addition from the fuel adding valve 5 being executed or the post injection being executed. When the temperature-raising processing is executed, the temperature of the exhaust gas is raised to the temperature at which the ammonia is desorbed from the SCR catalyst 41. More specifically, the temperature of the exhaust gas is raised to at least a temperature at which the amount of the ammonia desorbed from the SCR catalyst 41 exceeds the amount of the ammonia adsorbed onto the SCR catalyst 41. For example, in this embodiment, the temperature of the exhaust gas is raised to the adsorption limit temperature UT at which the SCR catalyst 41 becomes incapable of the ammonia adsorption. The regeneration treatment for the filter 32 may be forcibly initiated as the initialization processing as well.

Once the initialization processing is initiated, the control device 80 measures an initialization processing execution time ET (S230). This execution time ET represents the length of time elapsed since the initiation of the initialization processing.

Then, the control device 80 determines whether or not the execution time ET is equal to or longer than a threshold ET1 (S240). The execution time ET that is required for a complete desorption of the ammonia adsorbed on the SCR catalyst 41 is set in advance to this threshold ET1.

When the execution time ET falls short of the threshold ET1 (S240: NO), the control device 80 repeatedly performs the processing of Step S230 and the processing of Step S240 until the execution time ET becomes equal to or longer than the threshold ET1.

Once the execution time ET becomes equal to or longer than the threshold ET1, the control device 80 terminates the initialization processing. In other words, the control device 80 terminates the processing for raising the temperature of the exhaust gas (S250) and resets the execution time ET and the temperature integrated value HS to "0" (S260). Then, the control device 80 terminates this processing.

Figure 6:
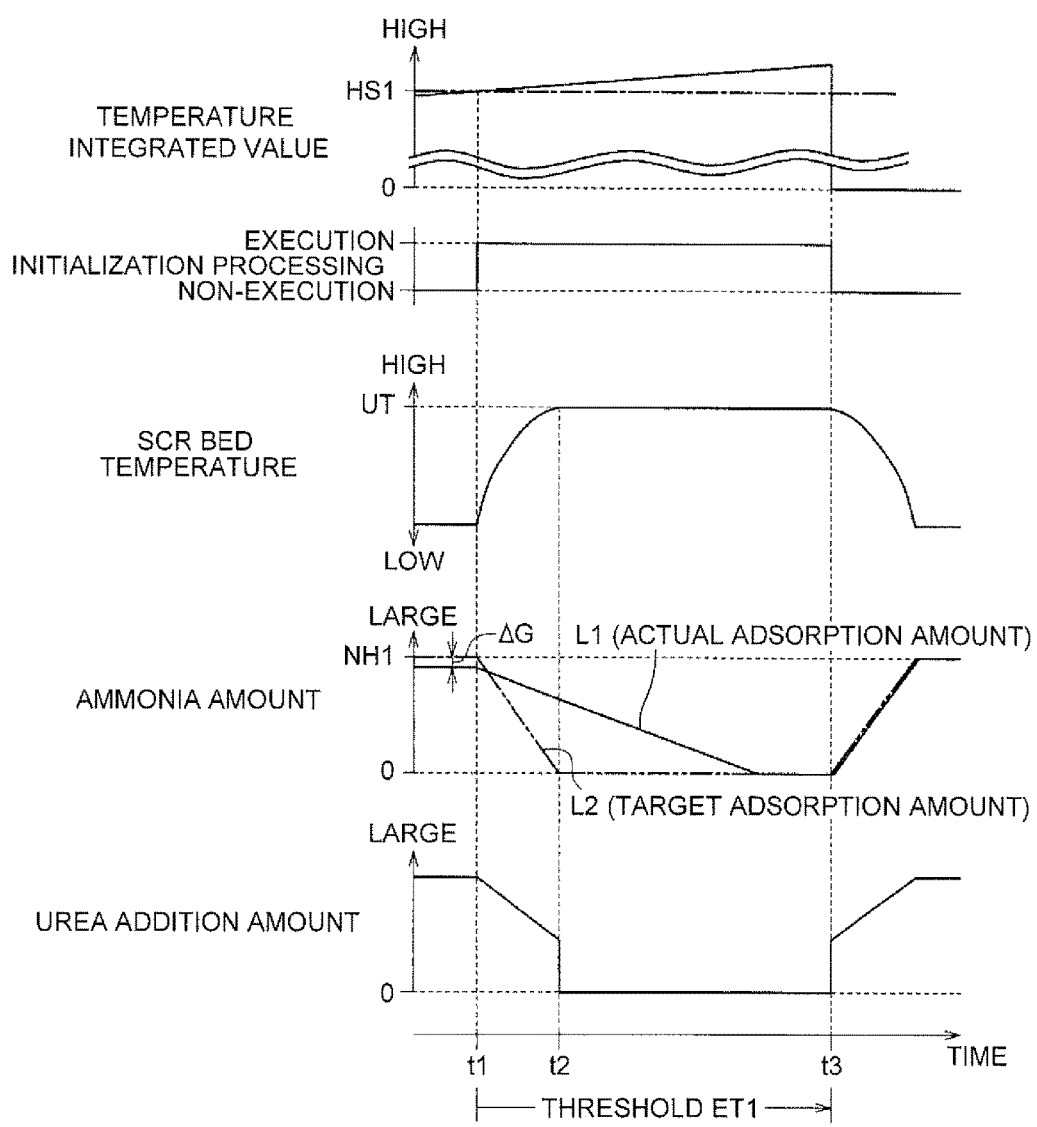
FIG. 6 is a timing chart illustrating an effect of the initialization processing according to the embodiment.

Hereinafter, an effect of the initialization processing will be described with reference to FIG. 6. The SCR bed temperature ST gradually increases by the initialization processing being initiated once the temperature integrated value HS becomes equal to or greater than the threshold HS1 at time t1. Because of this rise in the SCR bed temperature ST, the desorption of the ammonia from the SCR catalyst 41 is prompted, and thus the actual adsorption amount NHR ultimately becomes "0" after being gradually decreased as illustrated by a solid line L1.

In addition, as illustrated by a two-dot chain line L2, the target adsorption amount NHp gradually decreases with the rise in the SCR bed temperature ST. Once the SCR bed temperature ST reaches the adsorption limit temperature UT at time t2, the ammonia adsorption becomes impossible, and thus the target adsorption amount NHp is set to "0". Because of this decrease in the target adsorption amount NHp associated with the rise in the SCR bed temperature ST, the urea addition amount also gradually decreases. Once the target adsorption amount NHp is set to "0" at time t2, the urea addition amount for the ammonia adsorption is set to "0".

Once the execution time ET reaches the threshold ET1 at time t3, the initialization processing is terminated and the SCR bed temperature ST declines. In addition, after time t3, the ammonia adsorption amount control based on urea addition is initiated. In other words, setting of the target adsorption amount NHp based on the SCR bed temperature ST is performed and the urea addition for the ammonia adsorption is initiated, which causes the actual adsorption amount NHR to begin to increase again.

The initialization processing described above is executed prior to the initiation of the ammonia adsorption amount control at time t3, and thus the actual adsorption amount NHR is temporarily reset to "0". Accordingly, a cumulative error ΔG of the actual adsorption amount NHR with respect to the target adsorption amount NHp preceding the initiation of the execution of the initialization processing is eliminated. Accordingly, the period subsequent to time t3 is a state where the deviation of the actual adsorption amount NHR with respect to the target adsorption amount NHp is suppressed, in which the actual adsorption amount NHR of the SCR catalyst 41 is maintained at an appropriate amount in accordance with the target adsorption amount NHp.

Immediately after the termination of the initialization processing, the actual adsorption amount NHR is "0", and thus it is desirable that the actual adsorption amount NHR is increased rapidly. Accordingly, immediately after the initiation of the ammonia adsorption amount control at time t3 in FIG. 6, the actual adsorption amount NHR may be rapidly increased not by the target adsorption amount NHp being set based on the SCR bed temperature ST but by a relatively high value being set as the target adsorption amount NHp.

The following effects can be achieved by this embodiment as described above. (1) As the parameter for determining whether or not the high-temperature state of the SCR catalyst 41 has continued for a long period of time, the temperature integrated value HS, which is the integrated value of the temperature of the SCR catalyst 41 at the time when the temperature of the SCR catalyst 41 is equal to or higher than the threshold determined in advance, more specifically, when the temperature of the SCR catalyst 41 is equal to or higher than the temperature at which the ammonia is desorbed, is calculated. Then, on the condition that the temperature integrated value HS has become equal to or greater than the threshold HS1, the initialization processing for decreasing the amount of the ammonia adsorbed on the SCR catalyst 41 to "0" is executed. Accordingly, the initialization processing is reliably executed based on the temperature integrated value HS. Accordingly, an increase in the error of the actual adsorption amount NHR with respect to the target adsorption amount NHp that is attributable to the continuation of a state where the initialization processing is not executed can be suppressed.

(2) The detected value of the temperature of the exhaust gas flowing into the SCR catalyst 41 is corrected to decrease as the flow rate of the exhaust gas flowing into the SCR catalyst 41 decreases, and the corrected detected value is used as the catalyst temperature THEH of the SCR catalyst 41. Then, the temperature integrated value HS is obtained by the integration of the catalyst temperature THEH. During the calculation of the temperature integrated value HS described above, the effect of the exhaust gas flow rate regarding the amount of the heat transferred from the exhaust gas to the SCR catalyst 41 is taken into account, and thus the temperature integrated value HS can be accurately calculated.

(3) The temperature-raising processing for raising the temperature of the exhaust gas flowing into the SCR catalyst 41 to the temperature at which the ammonia is desorbed from the SCR catalyst 41 is executed as the initialization processing. Accordingly, the amount of the ammonia adsorbed on the SCR catalyst 41 can be decreased.

(4) The initialization processing execution time ET is measured and the initialization processing is executed until the measured execution time ET reaches the threshold ET1 determined in advance. Accordingly, by the threshold ET1 being appropriately set, the initialization processing can be terminated in a stage in which the amount of the ammonia adsorbed on the SCR catalyst 41 becomes "0".

The above-described embodiment can be put into practice after being modified as follows. As illustrated in FIG. 3, in this above-described embodiment, the constant fixed value NH1 is set as the target adsorption amount NHp in a case where the SCR bed temperature ST is equal to or lower than the temperature ST1. However, the manner in which the target adsorption amount NHp is set can be appropriately changed. For example, the target adsorption amount NHp may be variably set in accordance with the SCR bed temperature ST even in a case where the SCR bed temperature ST is equal to or lower than the temperature ST1. In addition, the target adsorption amount NHp may be variably set based on the amount of the NOx flowing into the SCR catalyst 41 per unit time.

The second exhaust gas temperature TH2 is corrected based on the exhaust gas flow rate EA in the integration processing for the calculation of the temperature integrated value HS. However, the temperature integrated value HS may also be calculated by the integration of the catalyst temperature THEH with this correction omitted and the second exhaust gas temperature TH2 used as the catalyst temperature THEH as it is.

The second exhaust gas temperature TH2, which is the temperature of the exhaust gas flowing into the SCR catalyst 41, is actually detected by the second exhaust gas temperature sensor 120. However, another method may also be adopted for the detection of the second exhaust gas temperature TH2, examples of which include estimation of the temperature of the exhaust gas flowing into the SCR catalyst 41 based on the engine operation states such as the engine load and the engine rotation speed and use of the estimated value as the second exhaust gas temperature TH2.

Figure 7:
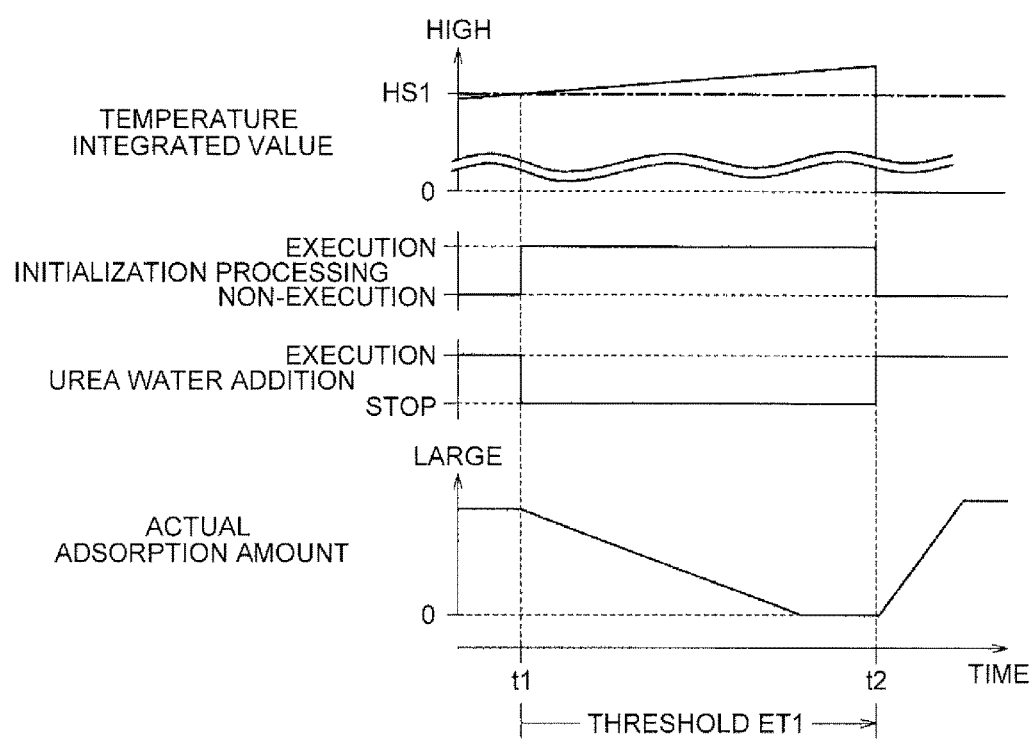
FIG. 7 is a timing chart illustrating an effect of an initialization processing according to a modification example of the embodiment.

The temperature-raising processing for raising the temperature of the exhaust gas flowing into the SCR catalyst 41 is executed as the initialization processing. However, as illustrated in FIG. 7, a processing for stopping the urea water addition from the urea water supply mechanism 200 may be executed as the initialization processing as well. Once the urea water addition is stopped as a result thereof, the reduction treatment of the NOx flowing into the SCR catalyst 41 is performed by the ammonia adsorbed on the SCR catalyst 41 before the urea water addition is stopped. Accordingly, as illustrated in FIG. 7, the ammonia adsorbed on the SCR catalyst 41 is consumed by a NOx reduction reaction after time t1, and the ammonia adsorption amount of the SCR catalyst 41 gradually decreases. Accordingly, the amount of the ammonia adsorbed on the SCR catalyst 41 can be decreased to "0" in the end.

The temperature-raising processing for raising the temperature of the exhaust gas flowing into the SCR catalyst 41 and the processing for stopping the urea water addition from the urea water supply mechanism 200 may be used in combination with each other as the initialization processing, too. In the embodiment described above, the initialization processing is performed until the actual ammonia adsorption amount NHR becomes "0". However, the actual adsorption amount NHR does not necessarily have to be decreased to "0" and the actual adsorption amount NHR may slightly exceed "0" at the completion of the initialization processing. In other words, the initialization processing described above may be executed such that the amount of the ammonia adsorbed on the SCR catalyst 41 is subjected to any decrease on the condition that the temperature integrated value HS has become equal to or greater than the threshold HS1. Even in this case, the initialization processing is reliably executed based on the temperature integrated value HS. Accordingly, the increase in the error of the actual adsorption amount NHR with respect to the target adsorption amount NHp that is attributable to the continuation of the state where the initialization processing is not executed can be suppressed.

What is claimed is:

1. An exhaust gas control system for an internal combustion engine including an exhaust gas control apparatus, the exhaust gas control apparatus including an injector and a catalyst, the injector being configured to add urea water to exhaust gas, and the catalyst being configured to adsorb ammonia resulting from the urea water and remove NOx in the exhaust gas by using the adsorbed ammonia, the exhaust gas control system comprising:
an electronic control unit configured to:
(i) set a target adsorption amount for the ammonia adsorbed onto the catalyst;
(ii) control a urea water addition amount by the injector based on the target adsorption amount;
(iii) acquire a temperature of the catalyst;
(iv) when the acquired temperature of the catalyst is equal to or higher than a threshold temperature determined in advance, execute an integration processing that calculates an integrated value of the temperature of the catalyst by summing plural acquisitions of the acquired temperature of the catalyst acquired at a predetermined cycle; and
(v) execute an initialization processing that decreases the amount of the ammonia adsorbed on the catalyst on a condition that the integrated value of the temperature of the catalyst calculated in the integration processing has become equal to or higher than a predetermined value.

2. The exhaust gas control system according to claim 1, wherein the electronic control unit is configured to
(1) acquire a temperature of the exhaust gas flowing into the catalyst,
(2) acquire a flow rate of the exhaust gas flowing into the catalyst, and
(3) correct the acquired temperature of the exhaust gas to decrease as the acquired flow rate of the exhaust gas decreases, and use the corrected temperature of the exhaust gas to calculate the integrated value of the temperature of the catalyst in the integration processing.

3. The exhaust gas control system according to claim 1, wherein the electronic control unit is configured to execute, as the initialization processing, a temperature-raising processing that raises the exhaust gas temperature of the exhaust gas flowing into the catalyst to a temperature at which the ammonia is desorbed from the catalyst.

4. The exhaust gas control system according to claim 1, wherein the electronic control unit is configured to execute, as the initialization processing, a processing that stops the urea water addition by the injector.

5. The exhaust gas control system according to claim 1, wherein the electronic control unit is configured to measure an execution time of the initialization processing and execute the initialization processing until the measured execution time reaches a threshold determined in advance.

6. An exhaust gas control method for an internal combustion engine including an exhaust gas control apparatus, the exhaust gas control apparatus including an injector and a catalyst, the injector being configured to add urea water to exhaust gas, and the catalyst being configured to adsorb ammonia resulting from the urea water and remove NOx in the exhaust gas by using the adsorbed ammonia, the exhaust gas control method comprising:
(i) setting, by an electronic control unit, a target adsorption amount for the ammonia adsorbed onto the catalyst;
(ii) controlling, by the electronic control unit, a urea water addition amount by the injector based on the target adsorption amount;
(iii) acquiring, by the electronic control unit, a temperature of the catalyst;
(iv) when the acquired temperature of the catalyst is equal to or higher than a threshold temperature determined in advance, executing, by the electronic control unit, an integration processing that calculates an integrated value of the temperature of the catalyst by summing plural acquisitions of the acquired temperature of the catalyst acquired at a predetermined cycle; and
(v) executing, by the electronic control unit, an initialization processing that decreases the amount of the ammonia adsorbed on the catalyst on a condition that the integrated value of the temperature of the catalyst calculated in the integration processing has become equal to or higher than a predetermined value.

7. The exhaust gas control method according to claim 6, further comprising:
  (1) acquiring, by the electronic control unit, a temperature of the exhaust gas flowing into the catalyst,
  (2) acquiring, by the electronic control unit, a flow rate of the exhaust gas flowing into the catalyst, and
  (3) correcting, by the electronic control unit, the acquired temperature of the exhaust gas to decrease as the acquired flow rate of the exhaust gas decreases, and using the corrected temperature of the exhaust gas to calculate the integrated value of the temperature of the catalyst in the integration processing.

8. The exhaust gas control method according to claim 6, wherein executing the initialization processing includes raising the exhaust gas temperature of the exhaust gas flowing into the catalyst to a temperature at which the ammonia is desorbed from the catalyst.

9. The exhaust gas control method according to claim 6, wherein executing the initialization processing includes stopping the urea water addition by the injector.

10. The exhaust gas control method according to claim 6, further comprising
  measuring, by the electronic control unit, an execution time of the initialization processing and executing the initialization processing until the measured execution time reaches a threshold determined in advance.

* * * * *